(12) United States Patent
Pattan et al.

(10) Patent No.: US 10,356,571 B2
(45) Date of Patent: Jul. 16, 2019

(54) METHOD AND DEVICE FOR SHARING ENRICHED INFORMATION ASSOCIATED WITH A CALL

(71) Applicant: Samsung Electronics Co., Ltd., Suwon-si, Gyeonggi-do (KR)

(72) Inventors: Basavaraj Jayawant Pattan, Bangalore (IN); Suresh Chitturi, Bangalore (IN); Ashok Kumar Selvaraj, Bangalore (IN); Nishant Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/528,337

(22) PCT Filed: Nov. 20, 2015

(86) PCT No.: PCT/KR2015/012557
§ 371 (c)(1),
(2) Date: May 19, 2017

(87) PCT Pub. No.: WO2016/080808
PCT Pub. Date: May 26, 2016

(65) Prior Publication Data
US 2017/0311136 A1 Oct. 26, 2017

(30) Foreign Application Priority Data
Nov. 20, 2014 (IN) .......................... 5820/CHE/2014

(51) Int. Cl.
*H04M 3/42* (2006.01)
*H04W 4/16* (2009.01)
*H04W 76/10* (2018.01)
*H04W 4/20* (2018.01)
*H04L 29/06* (2006.01)
*H04W 12/02* (2009.01)

(52) U.S. Cl.
CPC .......... *H04W 4/16* (2013.01); *H04L 65/1006* (2013.01); *H04L 65/1016* (2013.01); *H04L 65/1059* (2013.01); *H04L 65/1069* (2013.01); *H04L 65/1089* (2013.01); *H04W 4/20* (2013.01); *H04W 76/10* (2018.02); *H04W 12/02* (2013.01)

(58) Field of Classification Search
CPC .. H04M 1/0279; H04M 1/0281; H04B 1/3888
USPC ........................................ 455/414.1; 370/338
See application file for complete search history.

(56) References Cited

U.S. PATENT DOCUMENTS

| | | |
|---|---|---|
| 6,891,938 B1 | 5/2005 | Scott et al. |
| 8,788,704 B1 | 7/2014 | Chen et al. |
| 2003/0169866 A1 | 9/2003 | Williams et al. |

(Continued)

FOREIGN PATENT DOCUMENTS

WO 2012-136248 A1 10/2012

*Primary Examiner* — Marcos Batista
(74) *Attorney, Agent, or Firm* — Jefferson IP Law, LLP

(57) ABSTRACT

Embodiments herein provide a method for sharing enriched information associated with a call. The method includes receiving message including enriched information from a sender device, where the enriched information is received before establishing a call, after establishing a call, or after terminating a call. Further, the method includes determining a correlation between the enriched information with the call. Further, the method includes displaying the enriched information based on the correlation.

14 Claims, 13 Drawing Sheets

(56) References Cited

U.S. PATENT DOCUMENTS

| | | |
|---|---|---|
| 2006/0045251 A1 | 3/2006 | Liu et al. |
| 2009/0215479 A1 | 8/2009 | Karmarkar |
| 2009/0311999 A1* | 12/2009 | Sarkar ................... H04M 3/02 |
| | | 455/415 |
| 2012/0328083 A1 | 12/2012 | Kung et al. |
| 2013/0195258 A1 | 8/2013 | Atef et al. |
| 2014/0108568 A1* | 4/2014 | Lee ................... H04L 12/1818 |
| | | 709/206 |
| 2014/0125757 A1 | 5/2014 | Lee et al. |
| 2014/0321625 A1 | 10/2014 | Brown |
| 2014/0333713 A1* | 11/2014 | Shoemake ......... H04L 65/1069 |
| | | 348/14.05 |

* cited by examiner

[Fig. 1]
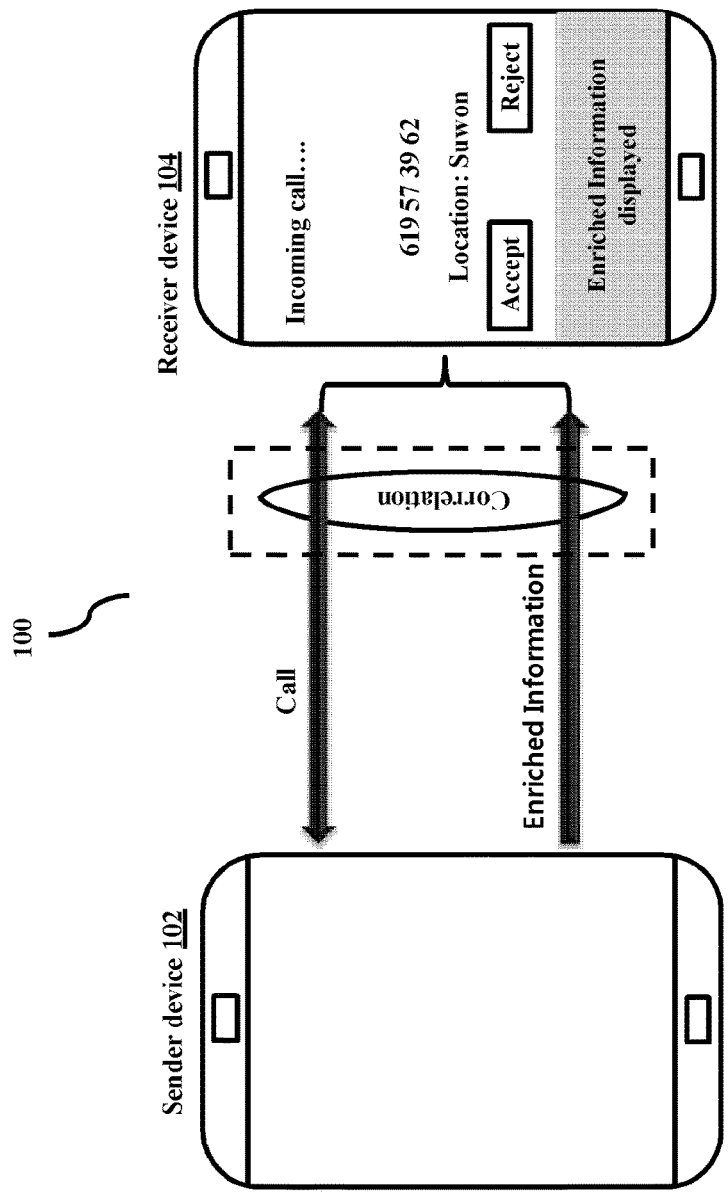
[Fig. 2]
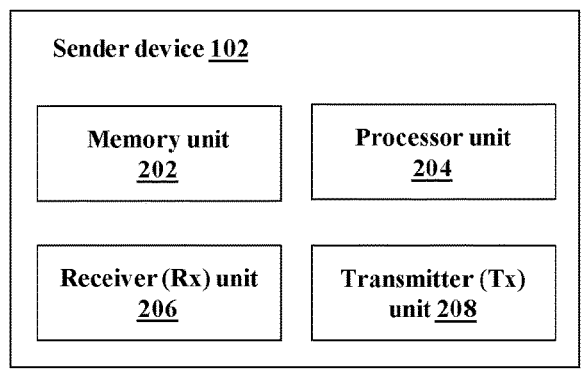

[Fig. 3]
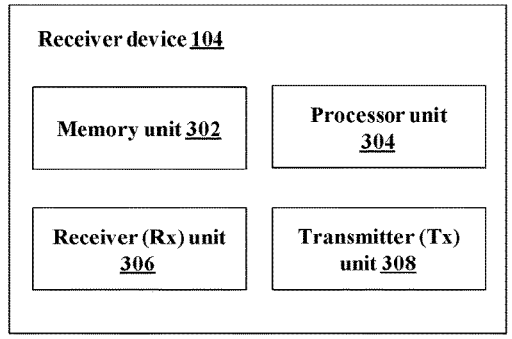
[Fig. 4]
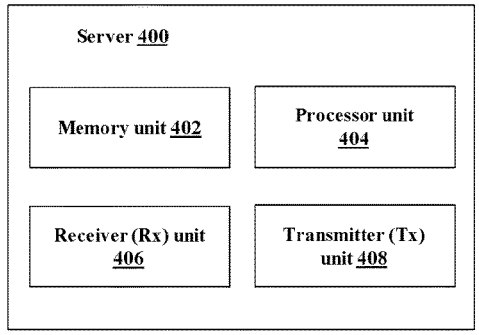
[Fig. 5]
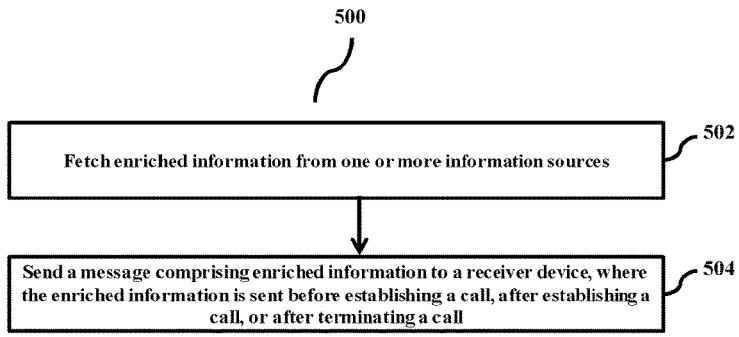
[Fig. 6]
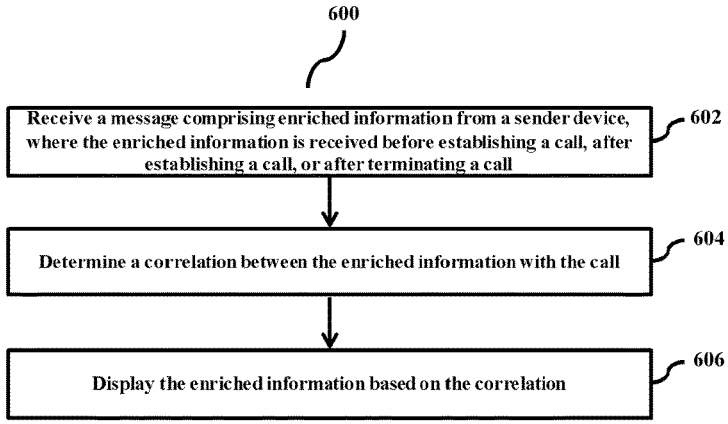

[Fig. 7]
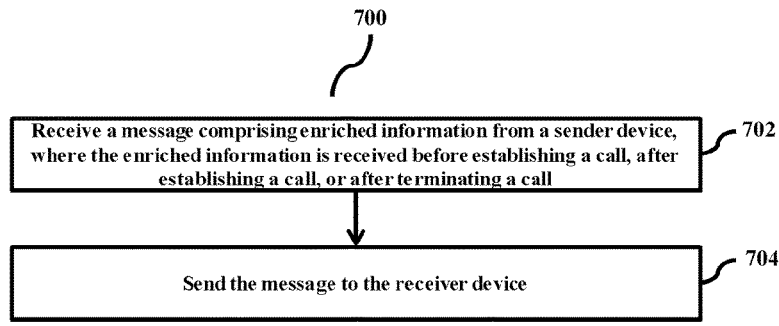
[Fig. 8]
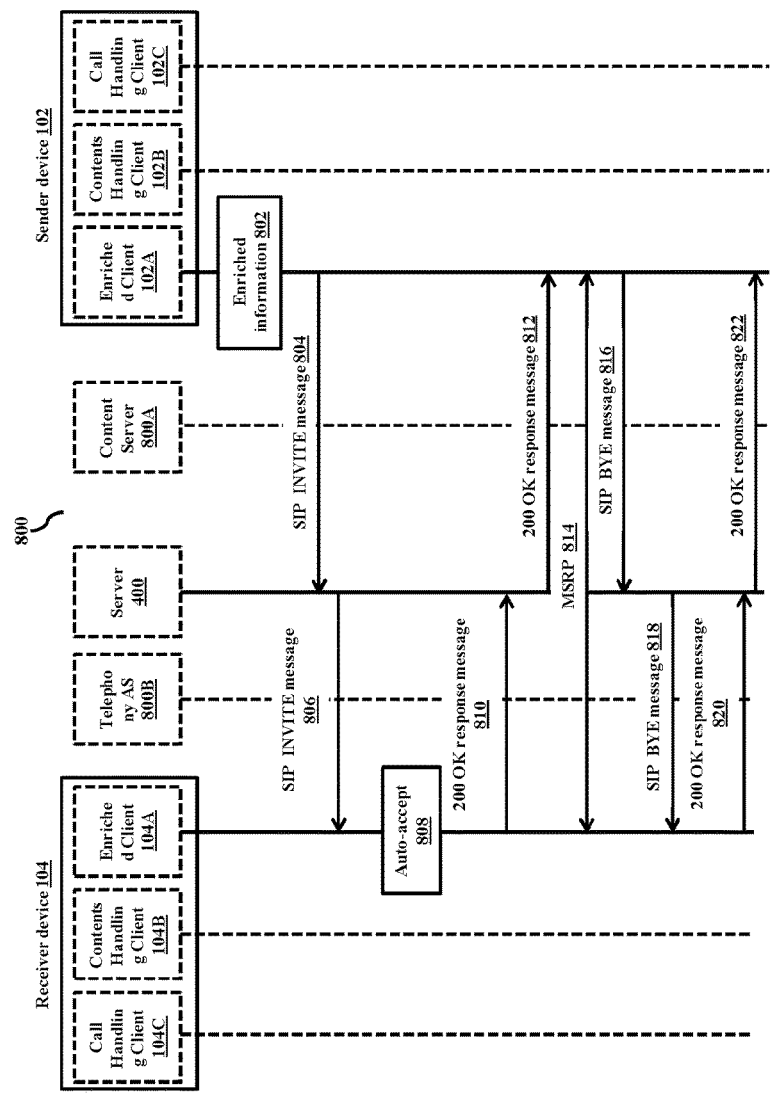

[Fig. 9]
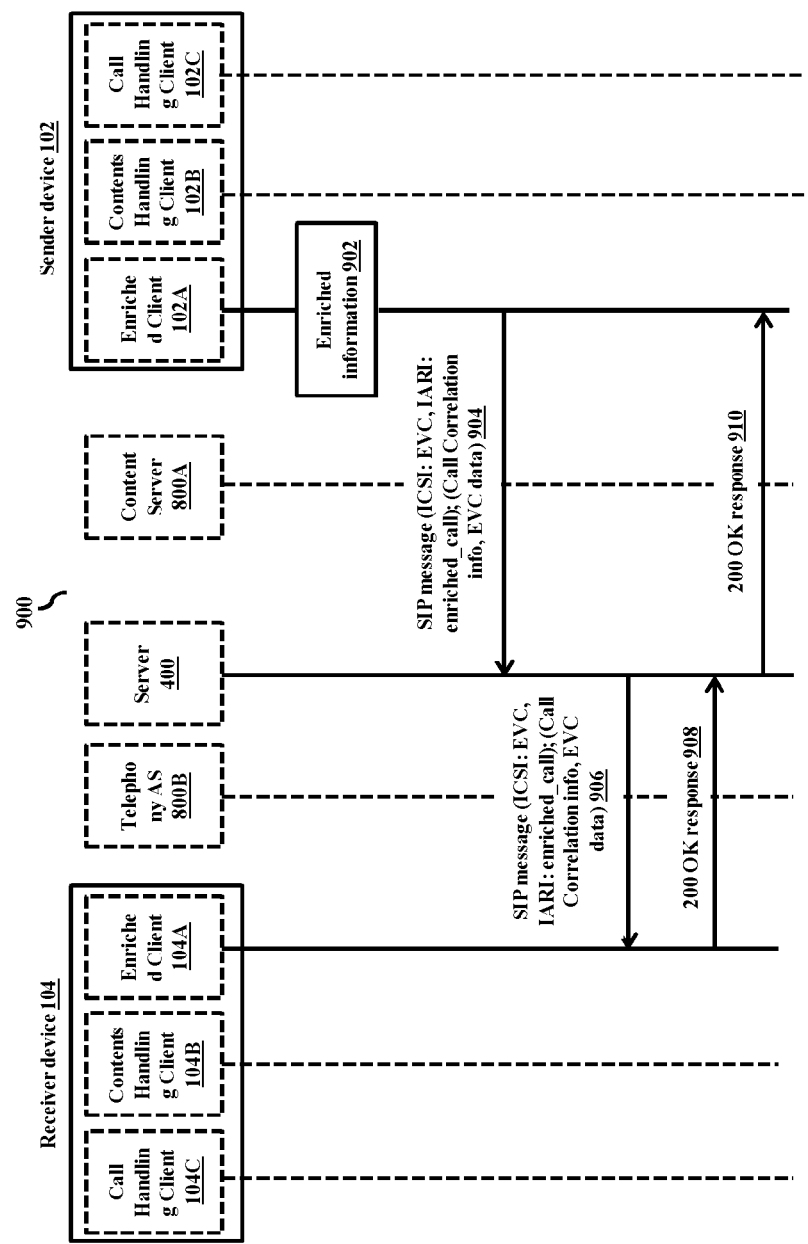

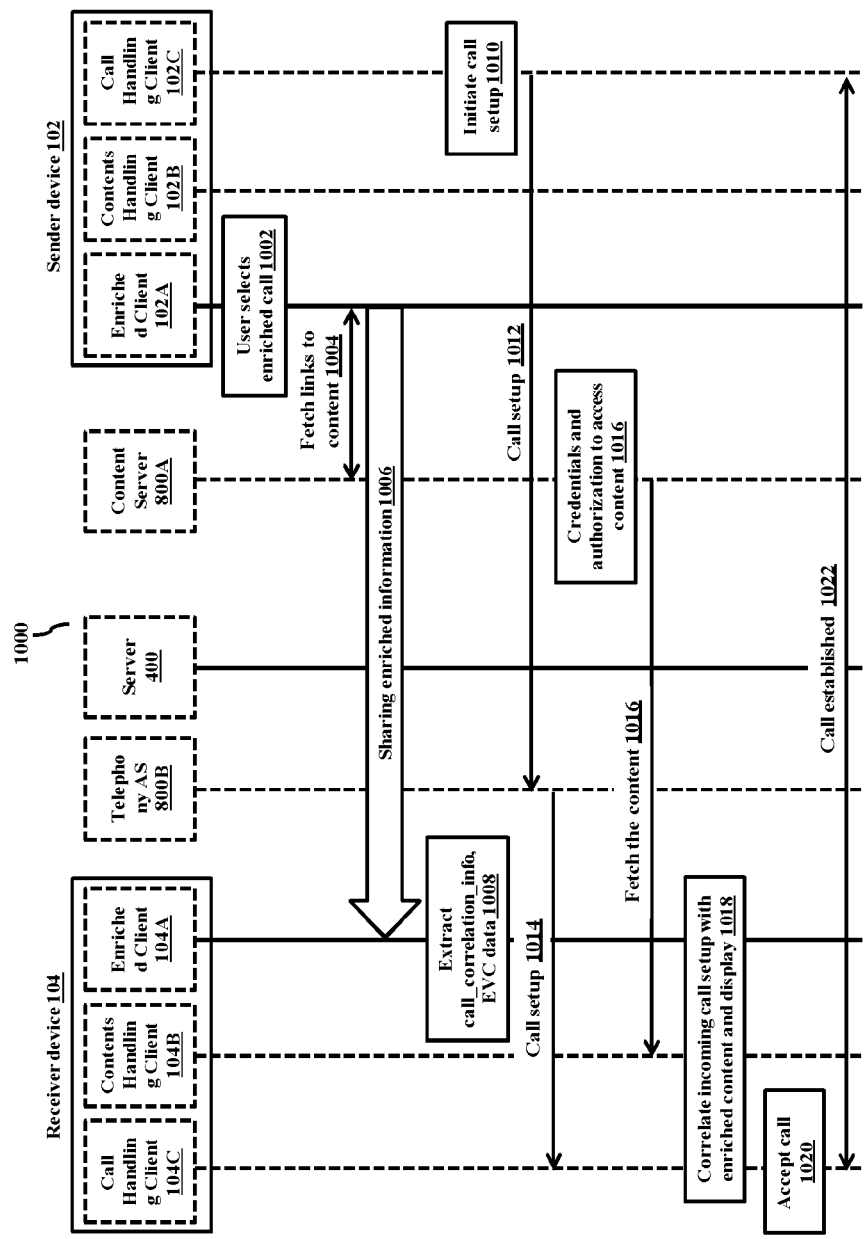
[Fig. 10]

[Fig. 11a]
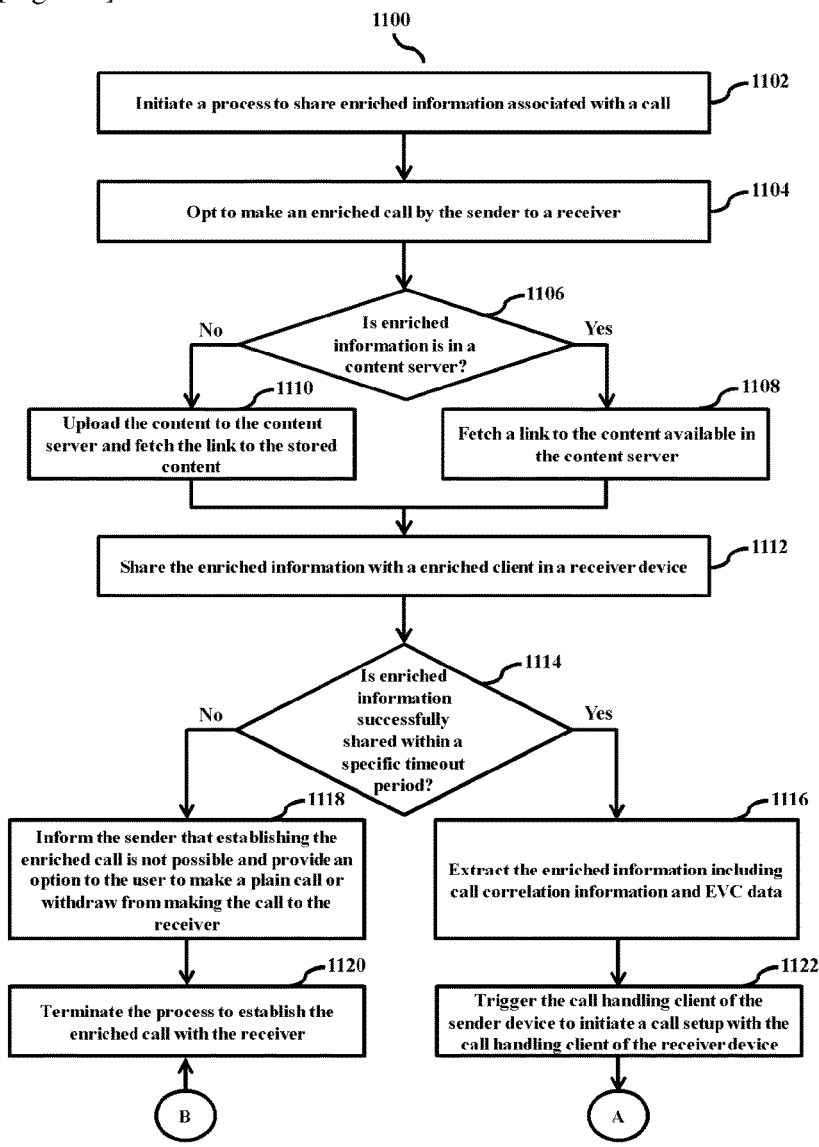

[Fig. 11b]
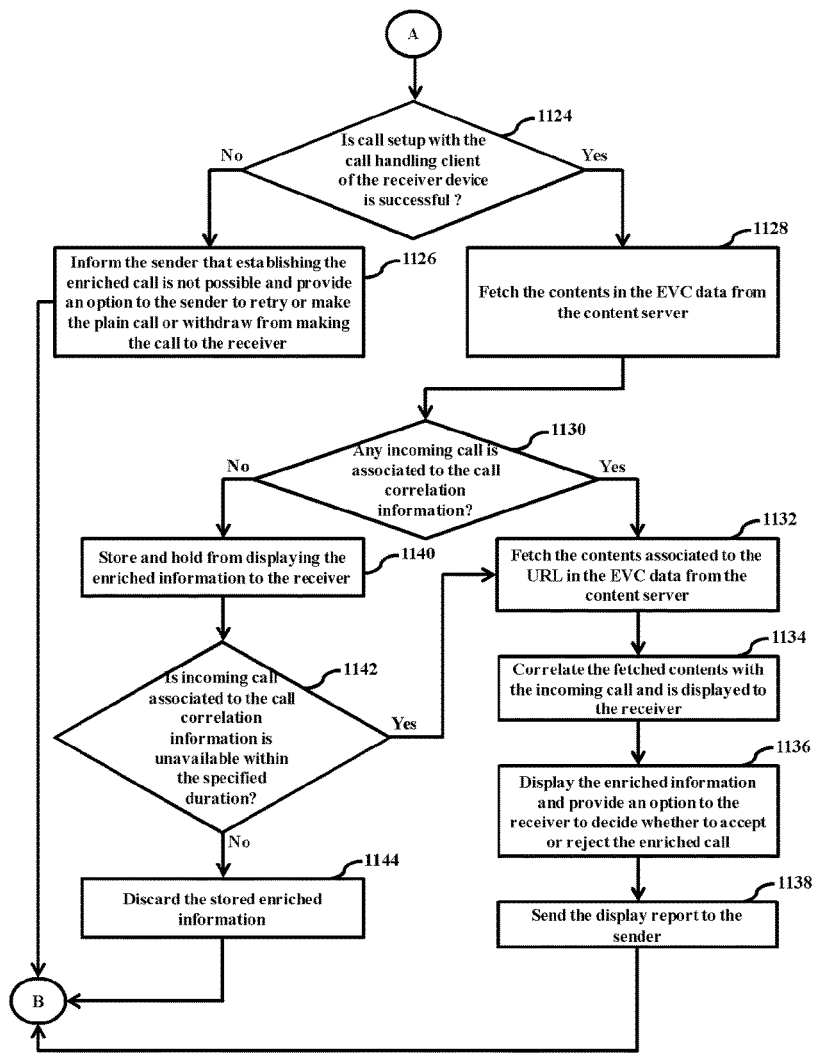

[Fig. 12]
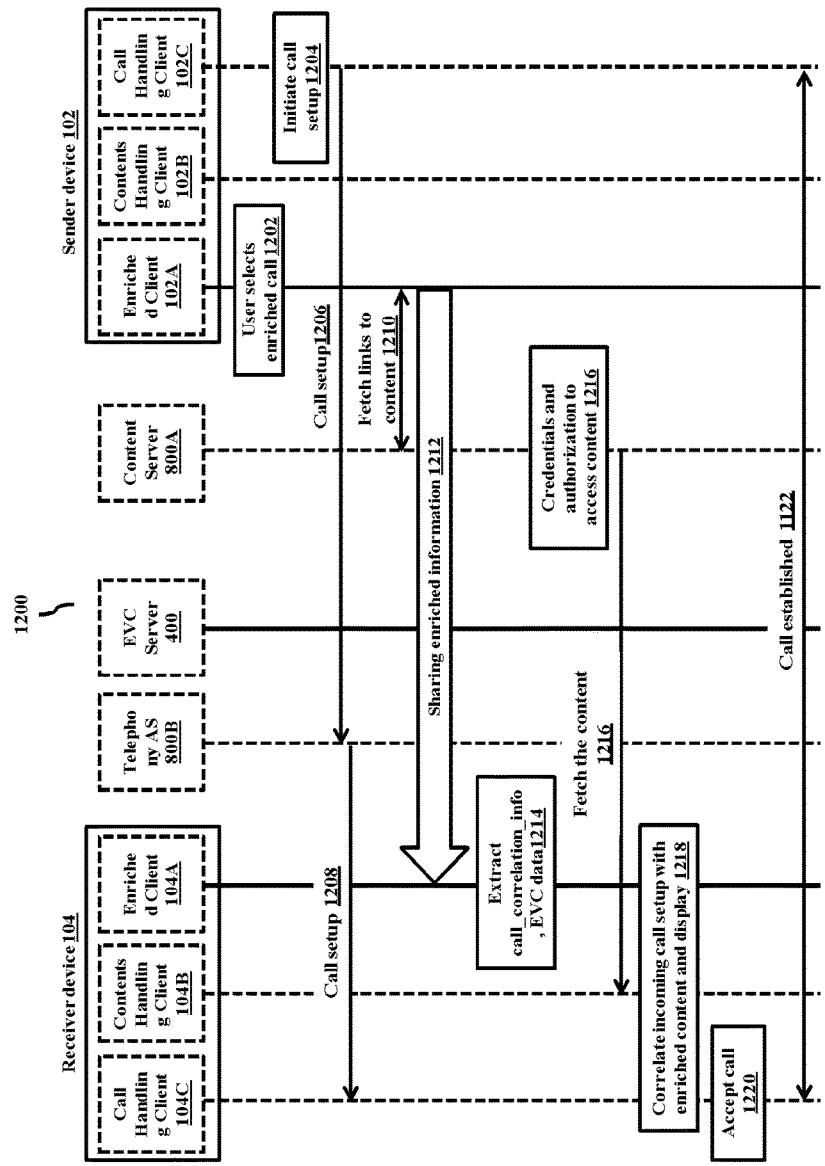

[Fig. 13a]
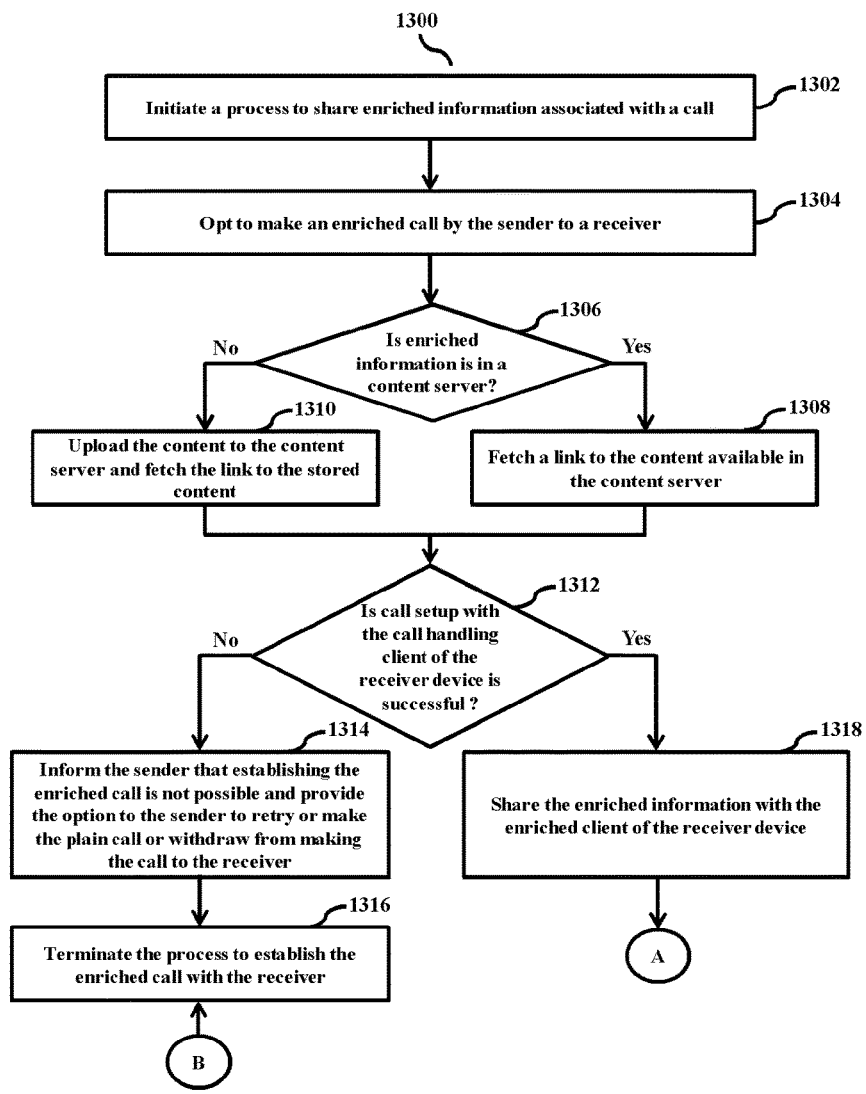

[Fig. 13b]
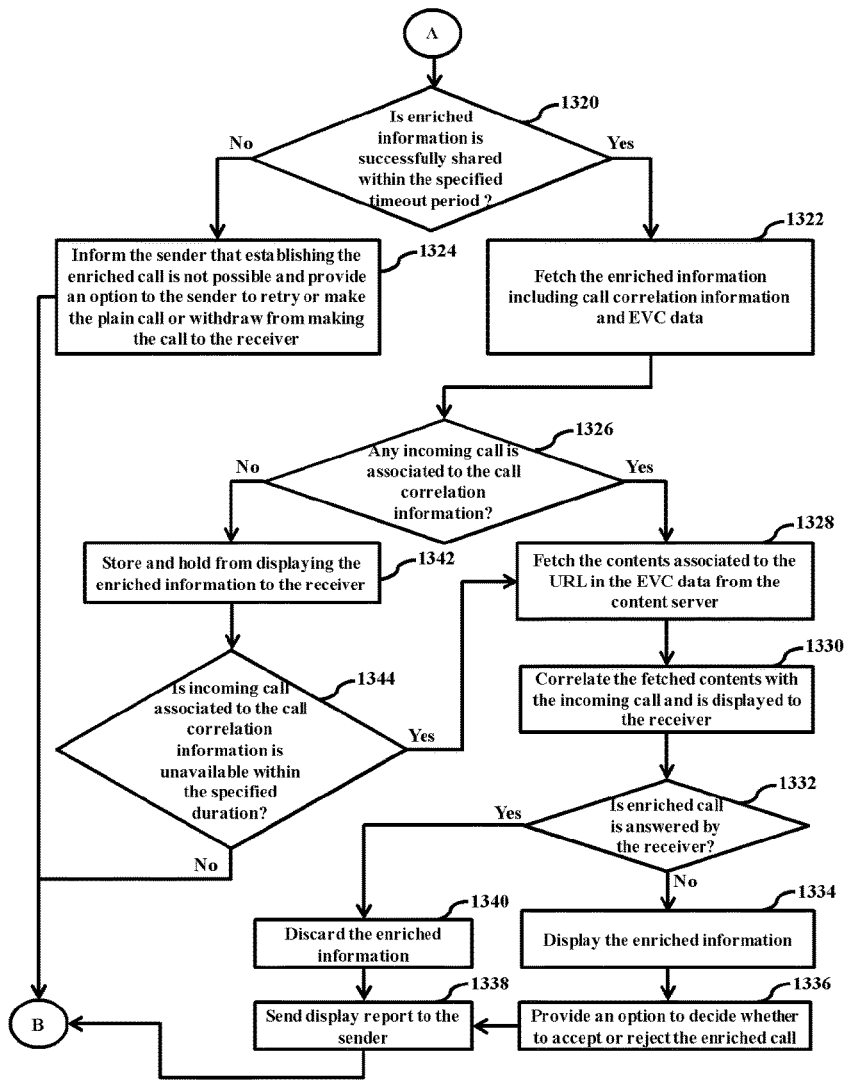

[Fig. 14]
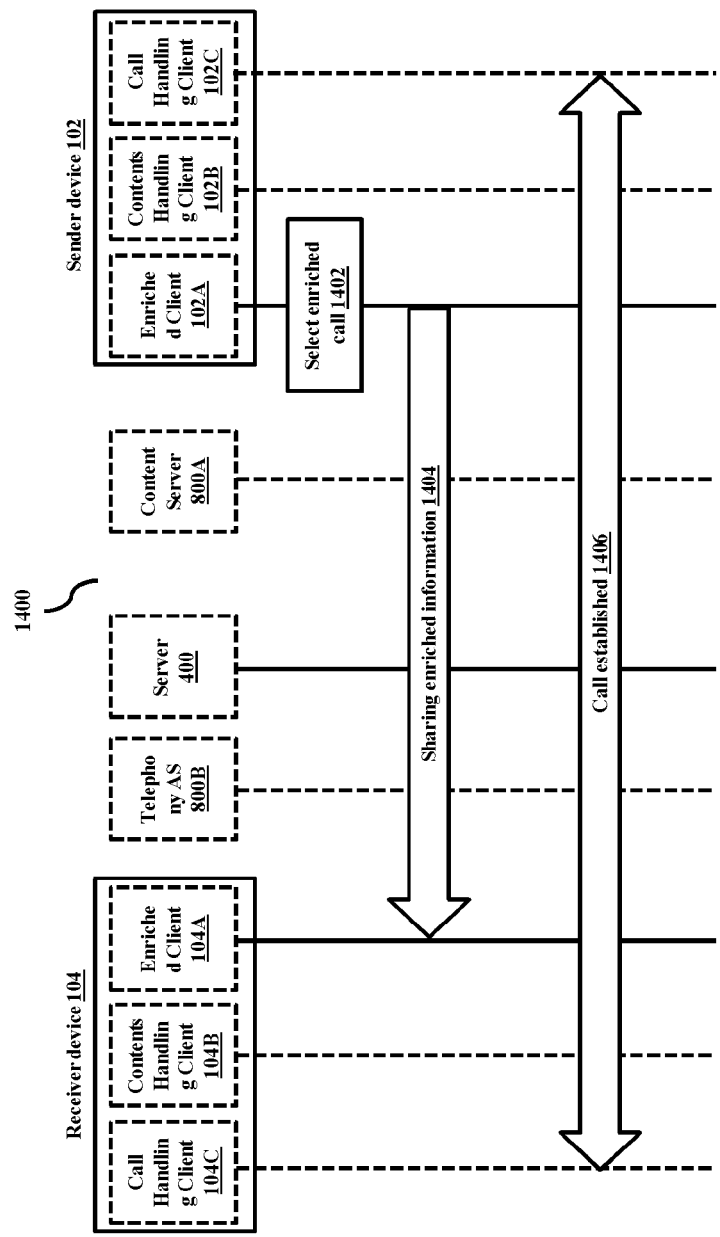

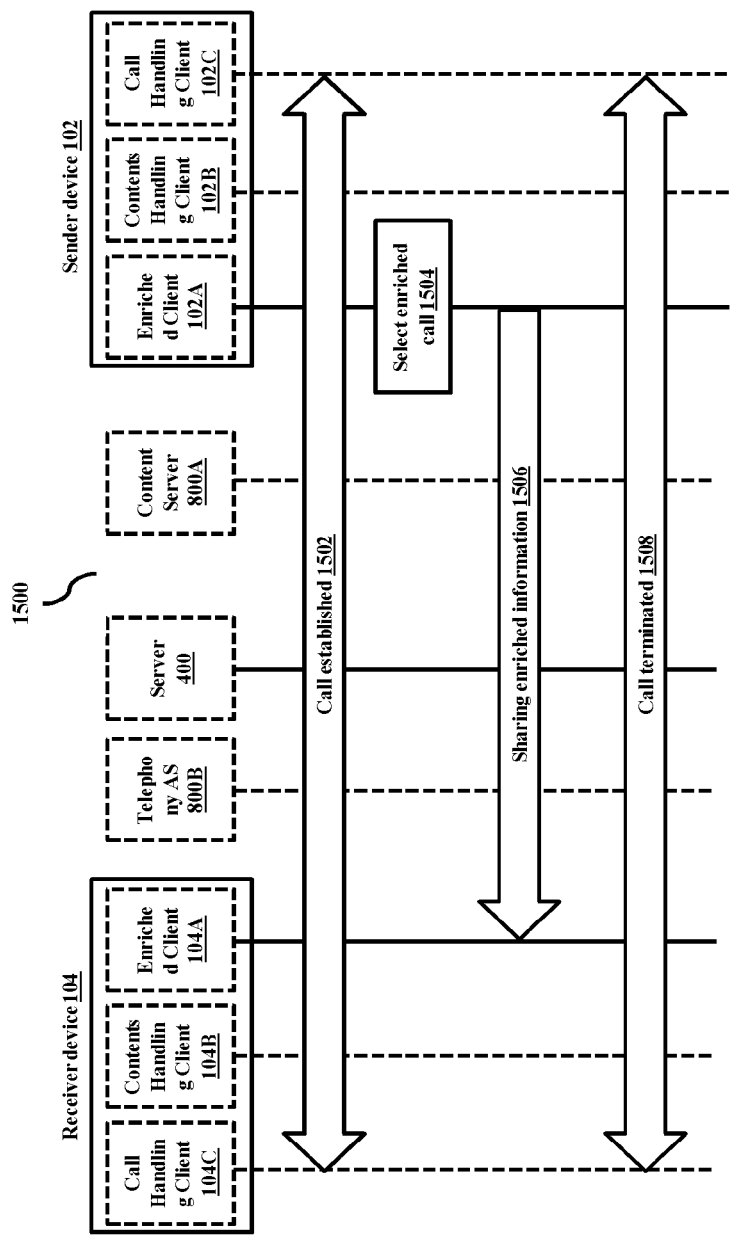
[Fig. 15]

[Fig. 16]
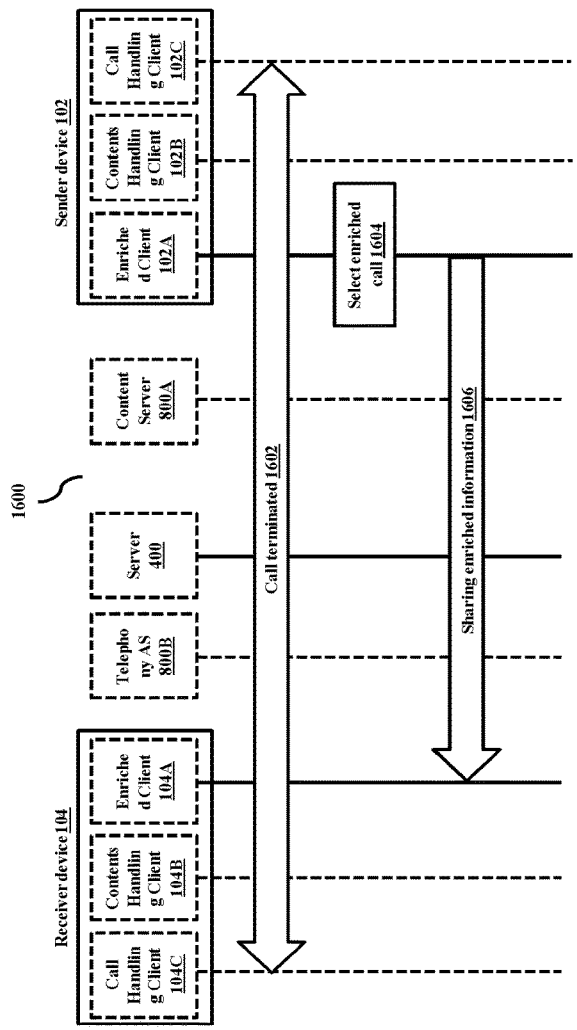
[Fig. 17]
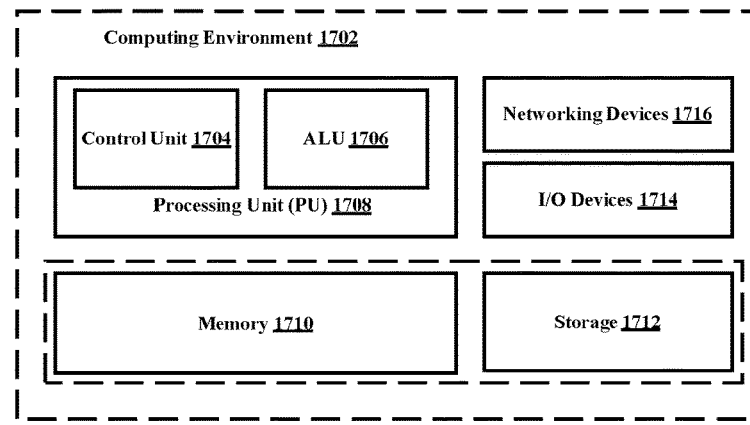

METHOD AND DEVICE FOR SHARING ENRICHED INFORMATION ASSOCIATED WITH A CALL

This application is a U.S. National Stage application under 35 U.S.C. § 371 of an International application filed on Nov. 20, 2015, and assigned application number PCT/KR2015/012557, which claimed the benefit of an Indian provisional patent application filed on Nov. 20, 2014, in the Indian Intellectual Property Office and assigned Serial number 5820/CHE/2014, and an Indian non-provisional patent application filed on Nov. 17, 2015, in the Indian Intellectual Property Office and assigned Serial number 5820/CHE/2014, the disclosures of each of which are hereby incorporated by reference.

TECHNICAL FIELD

The embodiments herein generally relate to wireless communications systems. More particularly, related to a mechanism for sharing enriched information associated with a call.

BACKGROUND ART

Traditionally, services like voice and call associated data (i.e., web browsing, apps, or the like) are accessed independently by a user. Since, the call and data are accessed on different interfaces, it is difficult to access call and data at the same time even if they are related to each other thus, limiting the user experience.

DISCLOSURE OF INVENTION

Technical Problem

Thus, there is need of a simple and robust mechanism to share enriched information associated with a call and in a timely manner.

Solution to Problem

The principal aspect of the embodiments herein is to provide a mechanism for sharing enriched information associated with a call and in a timely manner.

Another aspect of the embodiments herein is to provide a mechanism for receiving, at a receiver device, a message comprising enriched information from a sender device, where the enriched information is received before establishing a call.

Another aspect of the embodiments herein is to provide a mechanism for receiving, at a receiver device, a message comprising enriched information from a sender device, where the enriched information is received after establishing a call.

Another aspect of the embodiments herein is to provide a mechanism for receiving, at a receiver device, a message comprising enriched information from a sender device, where the enriched information is received after terminating a call.

Another aspect of the embodiments herein is to provide a mechanism for determining at the receiver device, a correlation between the enriched information with the call.

Another aspect of the embodiments herein is to provide a mechanism for displaying, at the receiver device, the enriched information based on the correlation.

Yet another aspect of the embodiment herein is to provide a mechanism for sending, by a sender device, a message comprising enriched information to a receiver device, where the enriched information is sent before establishing a call.

Yet another aspect of the embodiment herein is to provide a mechanism for sending, by a sender device, a message comprising enriched information to a receiver device, where the enriched information is sent after establishing a call.

Yet another aspect of the embodiment herein is to provide a mechanism for sending, by a sender device, a message comprising enriched information to a receiver device, where the enriched information is sent after terminating a call.

Yet another aspect of the embodiment herein is to provide a mechanism for receiving, by a server, a message comprising enriched information from a sender device, where the enriched information is received before establishing a call.

Yet another aspect of the embodiment herein is to provide a mechanism for receiving, by a server, a message comprising enriched information from a sender device, where the enriched information is received after establishing a call.

Yet another aspect of the embodiment herein is to provide a mechanism for receiving, by a server, a message comprising enriched information from a sender device, where the enriched information is received after terminating a call.

Accordingly the embodiments herein provide a method for sharing enriched information associated with a call. The method comprises receiving, by a receiving device, a message comprising enriched information from a sending device, wherein the enriched information is received one of before establishing a call, after establishing a call, and after terminating a call, determining, by the receiving device, a correlation between the enriched information with the call, and displaying, by the receiving device, the enriched information based on the correlation.

Accordingly the embodiments herein provide a method for sharing enriched information associated with a call. The method comprises sending, by a sending device, a message comprising enriched information to a receiving device, wherein the enriched information is sent one of before establishing a call, while establishing a call, after establishing a call, and after terminating a call.

Accordingly the embodiments herein provide a method for sharing enriched information associated with a call. The method comprises receiving, by a server, a message comprising enriched information from a sending device, wherein the enriched information is received one of before establishing a call, after establishing a call, and after terminating a call, and sending, by the server, the message to the receiving device.

Accordingly the embodiments herein provide a receiving device for sharing enriched information associated with a call. The receiving device comprises a receiver configured to receive a signal, and a controller configured to control to receive a message comprising enriched information from a sending device, wherein the enriched information is received one of before establishing a call, after establishing a call, and after terminating a call, determine a correlation between the enriched information with the call, and display the enriched information based on the correlation.

Accordingly the embodiments herein provide a sending device for sharing enriched information associated with a call. The sending device comprises a transmitter configured to send a signal, and a controller configured to control to send a message comprising enriched information to a receiving device, wherein the enriched information is sent one of before establishing a call, after establishing a call, and after terminating a call.

Accordingly the embodiments herein provide a server for sharing enriched information associated with a call. The server comprises a transceiver configured to send/receive a signal, and a controller configured to control to receive a message comprising enriched information from a sending device, wherein the enriched information is received one of before establishing a call, after establishing a call, and after terminating a call, and send the message to the receiving device.

Accordingly the embodiments herein provide a computer program product comprising computer executable program code recorded on a computer readable non-transitory storage medium. The computer executable program code when executed causing the actions includes receiving, by a receiving device, a message comprising enriched information from a sending device, wherein the enriched information is received one of before establishing a call, after establishing a call, and after terminating a call, determining, by the receiving device, a correlation between the enriched information with the call, and displaying, by the receiving device, the enriched information based on the correlation.

Accordingly the embodiments herein provide a computer program product comprising computer executable program code recorded on a computer readable non-transitory storage medium. The computer executable program code when executed causing the actions includes sending, by a sending device, a message comprising enriched information to a receiving device, wherein the enriched information is sent one of before establishing a call, while establishing a call, after establishing a call, and after terminating a call.

Accordingly the embodiments herein provide a computer program product comprising computer executable program code recorded on a computer readable non-transitory storage medium. The computer executable program code when executed causing the actions includes receiving, by a server, a message comprising enriched information from a sending device, wherein the enriched information is received one of before establishing a call, after establishing a call, and after terminating a call, and sending, by the server, the message to the receiving device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates a wireless communication system for sharing enriched information associated with a call, according to an embodiment disclosed herein;

FIG. 2 illustrates various units in a sender device, according to an embodiment disclosed herein;

FIG. 3 illustrates various units in a receiver device, according to an embodiment disclosed herein;

FIG. 4 illustrates various units in a server, according to an embodiment disclosed herein;

FIG. 5 is a flow diagram illustrating a method for sharing enriched information associated with a call by a sender device, according to an embodiment as disclosed herein;

FIG. 6 is a flow diagram illustrating a method for displaying enriched information associated with a call on a receiver device, according to an embodiment as disclosed herein;

FIG. 7 is a flow diagram illustrating a method for sharing enriched information associated with a call via a server, according to an embodiment as disclosed herein;

FIG. 8 is a sequence diagram illustrating a method for sharing enriched information associated with a call in a session, according to an embodiment as disclosed herein;

FIG. 9 is a sequence diagram illustrating a method for sharing enriched information associated with a call using a SIP message, according to an embodiment as disclosed herein;

FIG. 10 is a sequence diagram illustrating a method for establishing an enriched call setup, where enriched information is shared initially followed by a call setup, according to an embodiment as disclosed herein;

FIGS. 11a and 11b is a flow diagram illustrating a method for establishing enriched call, where enriched information is shared initially followed by a call setup, according to an embodiment as disclosed herein;

FIG. 12 is a sequence diagram illustrating a method for establishing an enriched call, where the call is setup initially followed by sharing enriched information associated with the call, according to an embodiment as disclosed herein;

FIGS. 13a and 13b is flow diagram illustrating a method establishing an enriched call, where the call is setup initially followed by sharing enriched information associated with the call, according to an embodiment as disclosed herein;

FIG. 14 is a sequence diagram illustrating a method for sharing enriched information before establishing a call, according to embodiment as disclosed herein;

FIG. 15 is a sequence diagram illustrating a method for sharing enriched information after establishing a call, according to an embodiment as disclosed herein;

FIG. 16 is a sequence diagram illustrating a method for sharing enriched information after terminating a call, according to an embodiment as disclosed herein; and FIG. 17 illustrates a computing environment implementing the method for sharing enriched information associated with a call, according to an embodiment as disclosed herein.

MODE FOR INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for sharing enriched in associated with a call. The method includes receiving a message including enriched information from a sender device. The enriched information is received before establishing a call, after establishing a call, or after terminating a call. Further, the method includes determining a correlation between the enriched information with the call. Further, the method includes displaying the enriched information based on the correlation.

In an embodiment, the call is a Circuit Switched (CS) call or a Packet Switched (PS) call.

In an embodiment, the message received from the sender device includes the enriched information and a call setup request when the call is the PS call.

In an embodiment, a receiver device fetches the enriched information from at least one information source.

In an embodiment, the enriched information is automatically accepted by the receiver device.

In an embodiment, the enriched information includes sender provided information.

Another aspect of the embodiment herein discloses a method for sharing enriched information associated with the call. The method includes sending a message comprising enriched information to the receiver device. The enriched information is sent before establishing a call, after establishing a call, or after terminating a call.

In an embodiment, the sender device fetches the enriched information from the information source(s).

Another aspect of the embodiment herein discloses a method for sharing enriched information associated with the call. The method includes receiving the message including the enriched information from the sender device. The enriched information is received before establishing the call, after establishing the call, or after terminating the call. Further, the method includes sending the message to the receiver device.

In an embodiment, the server is an Enhance Visual Call (EVC) server.

Unlike the conventional systems and methods, the proposed method provides a robust and simple mechanism for sharing the enriched information associated with the call thus, enhancing communication experience. The proposed method allows the user to enhance the standard (or plain) voice call experience. In an example, the sender can share the enriched information to receiver. The receiver receives the call and the enriched information such as a subject, a location, a picture, or the like is shared before establishing the call with a receiver device by a sender device. In another example, the sender or receiver can share the enriched information during the call. In another example, the sender can share the enriched information when the call is rejected or unanswered by the receiver.

The labels "First" and "Second" are used for illustrative purpose and are not intended to limit the scope of the invention. Further, it is to be understood that the labels "First" and "Second" may be used interchangeably and can be plurality of devices.

The Call described throughout the description refers to either Circuit Switched (CS) call or Packet Switched (PS) call.

The words "Content source" and "Information source" are used interchangeably throughout the description.

Referring now to the drawings, and more particularly to FIGS. 1 through 17, where similar reference characters denote corresponding features consistently throughout the figures, there are shown preferred embodiments.

FIG. 1 illustrates a wireless communication system 100 for sharing enriched information associated with a call, according to an embodiment disclosed herein. In an embodiment, the wireless communication system 100 includes a sender device 102 and a receiver device 104. In another embodiment, in addition to the sender device 102 and the receiver device 104, the wireless communication system 100 includes a server (not shown) which helps in exchanging one or more signaling messages between the sender device 102 and the receiver device 104. The signaling messages are exchanged for sharing the enriched information associated with the call. The sender device 102 or the receiver device 104 can be, for example, a laptop, a desktop computer, a mobile phone, a smart phone, Personal Digital Assistants (PDAs), a tablet, a phablet, a consumer electronic device, dual display devices, or any other electronic device.

In an embodiment, consider a scenario where a sender (i.e., can be referred as Enhanced Visual Call (EVC) user) associated with the sender device 102 tries to establish an enriched call with a receiver (i.e., can be referred as EVC user) associated with the receiver device 104. Before establishing the enriched call, the sender device 102 can be configured to send a message including the enriched information to the receiver device 104. In an embodiment, the sender device 102 sends the enriched information before establishing a call with the receiver device 104. In another embodiment, the sender device 102 sends the enriched information after establishing a call with the receiver device 104. In another embodiment, the sender device 102 sends the enriched information after terminating a call with the receiver device 104. The enriched information can be, for example, the text (i.e., plain text or real-time text), multi-media contents, profile information, Social Networking Site (SNS) content, web content, context of the call, location information, customer identifier, or the like. In an embodiment, the EVC user can be either the normal end user or the business end user where both need to have the EVC service subscription.

After receiving the enriched information, the receiver device 104 can be configured to correlate the enriched information with the call. In an embodiment, the enriched information received by the receiver device 104 is associated (i.e., correlated) with the call. Therefore, to correlate the enriched information with the call, a common Extensible Markup Language (XML) structure is defined for the EVC specific events. In an embodiment, the XML structure is defined for the EVC specific events using the Converged IP Messaging (CPM) event framework. The element "enriched information (<evcenrichedinfo>) is the root EVC event element that appears under the <cpm-evfw> element as described in [CPM-CONV-TS_2.1] section 6.7 "CPM Event Reporting Framework", and includes "call correlation information (i.e., <call-correlation-info>) element", which is used to uniquely identify the call associated with the enriched information. The call correlation information element can include one "from (i.e., <from>) element", which is a unique identifier of the originating sender and can be either MSISDN or SIP URI. Further, the call correlation information element one "to (i.e., <to>) element", which is a unique identifier of the receiver and can either be Mobile Station International Subscriber Directory Number (MSISDN) or Session Initiation Protocol (SIP) Uniform Resource Locator (URL).

Further, optionally, the call correlation information element can include one "call segment (i.e., <call-seq>) element", which is a unique identifier for identifying a Packet Switched (PS) call transaction. Further, optionally, the call correlation information element can include one "subject (i.e., <subject>) element", which is the information about the call added by the sender. In an embodiment, the maximum length of the subject field is 100 characters. Further, the call correlation information element can include any other elements which help in sharing the enriched information and establish the enriched call.

Further, the enriched information element can include call associated data (i.e., <call-associated-data>) element containing the enriched information that is being shared and have a "type" attribute to indicate the type of scenario. The possible values are "P2P" indicating person-to-person scenario, "b2c" indicating business-to-client scenario, or "wpc" indicating web and call scenario. Further, the enriched information element can include one or more link (i.e., <link>) elements for sharing a hyperlink such as a Hyper Text Transfer Protocol (HTTP) URL to the information to which the sender needs to associate the call. The URL may represent a reference user profile, blogs, SNS content, picture, a filled web form, or web content related to the call.

Further, optionally, the enriched information element can include a location (i.e., <location>) element for sharing the sender's location information. The location element can include <lat> element which represents the latitude and <long> element which represents the longitude or any other representation of the location information. Further, optionally, the enriched information element can include a web reference identifier (i.e., <web-reference-id>) element for sharing the sender's web transaction reference associated with the browsing business web content information. Further, optionally, the enriched information element can include any other element.

Further, the receiver device 104 can be configured to display the enriched information based on the correlation. In an embodiment, the receiver device 104 fetches the enriched information from at least one information source. In an example, consider a scenario where an EVC user-B (i.e., sender) tries to establish the call with an EVC user-A (i.e., receiver). The EVC user-B selects the contact of the EVC user-A; and the SNS content (i.e., enriched information) to be shared with the EVC user-A before placing the call. After receiving the SNS content, the EVC user-A views the SNS content of the EVC user-B before accepting the incoming call. Further, the EVC user-A can also share his/her SNS content with the EVC user-B thus, continuing the call. The EVC user-B can also view the SNS content of the EVC user-A during the ongoing call.

In another example, consider a scenario where the sender tries to establish the call a pizza center. Before establishing the call, the sender shares the enriched information with the pizza center (i.e., receiver), where the information regarding the enriched information is displayed to the receiver. Further, the functionalities of the sender device 102 are explained in conjunction with the FIG. 2. The functionalities of the receiver device 104 are explained in conjunction with the FIG. 3.

Unlike the conventional systems and methods, the proposed method enhances the standard (i.e., plain) voice call experience. In an example, the sender can share the enriched information to the receiver. The receiver can view the enriched information including the subject, the location, the picture, or the like while receiving the call from the sender (i.e., pre-call scenario). In another example, the sender can share the enriched information such as messages, files (or group of files like presentations), the location, the background, audio, video, or the like during the call (i.e., mid-call experience). In another example, the sender can share the enriched information with the receiver after terminating the call.

In an embodiment, in case of a Circuit Switched (CS) call and a Packet Switched (PS) call, the enriched information can be shared in a separate message from the call. In another embodiment, in case of the PS call, the enriched information can be sent inside the call. When the enriched information is sent inside the call, then the process for correlating the enriched information associated with the call is eliminated.

The FIG. 1 shows the limited overview of the wireless communication system 100 but, it is to be understood that other embodiments are not limited thereto. Further, the wireless communication system 100 can include any number of devices and a server. Further, the wireless communication system 100 includes any number of hardware or software components communicating with each other. By way of illustration, both an application running on a device and the device itself can be a component.

FIG. 2 illustrates various units in a sender device 102, according to an embodiment as disclosed herein. In an embodiment, the sender device 102 includes a memory unit 202, a processor unit 204, a receiver (Rx) unit 206, and a transmitter (Tx) unit 208.

The memory unit 202 may include one or more computer-readable storage media. The memory unit 202 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 202 may, in some examples, be considered a non-transitory storage medium. The term "non-transitory" may indicate that the storage medium is not embodied in a carrier wave or a propagated signal. However, the term "non-transitory" should not be interpreted to mean that the memory unit 202 is non-movable. In some examples, the memory unit 202 can be configured to store larger amounts of information than the memory. In certain examples, a non-transitory storage medium may store data that can, over time, change (e.g., in Random Access Memory (RAM) or cache).

The processor unit 204 can be configured to send the message including the enriched information to the receiver device 104 by using the Tx unit 208. In an embodiment, the processor unit 204 can be configured to send the enriched information before establishing the call with the receiver device 104. In another embodiment, the processor unit 204 can be configured to send the enriched information in parallel while establishing the call. In another embodiment, the processor unit 204 can be configured to send the enriched information after establishing the call. In another embodiment, the processor unit 204 can be configured to send the enriched information after terminating the call. Further, the processor unit 204 can be configured to fetch the enriched information from the information source(s). The Rx unit 206 communicates internally with the units and externally with the receiver device 104. Further, the functionalities of the sender device 102 are explained in conjunction with the FIGS. 8-16.

In an embodiment, the call is the CS call or the PS call. In an embodiment, the message received from the sender device 102 includes the enriched information and a call setup request when the call is the PS call. In an example, the enriched information and the call setup request can be included in the same message and can be sent to the receiver device 104.

The FIG. 2 shows exemplary units of the sender device 102 but it is to be understood that other embodiments are not limited thereon. In other embodiments, the sender device 102 may include less or more number of units. Further, the labels or names of the units are used only for illustrative purpose and does not limit the scope of the invention. One or more units can be combined together to perform same or substantially similar function in the sender device 102.

FIG. 3 illustrates various units in the receiver device 104, according to an embodiment as disclosed herein. In an embodiment, the receiver device 104 includes a memory unit 302, a processor unit 304, a receiver (Rx) unit 306, and a transmitter (Tx) unit 308.

The memory unit 302 may include one or more computer-readable storage media. The memory unit 302 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 302 may, in some examples, be considered a non-transitory storage medium. The term "non-transitory" may indicate that the storage medium is not embodied in a carrier wave or a propagated signal. However, the term "non-transitory" should not be interpreted to mean that the memory unit 302 is non-movable. In some examples, the memory unit 302 can be configured to store larger amounts of information than the memory. In certain examples, a non-transitory storage medium may store data that can, over time, change (e.g., in Random Access Memory (RAM) or cache).

The processor unit 304 can be configured to receive the message including the enriched information from the sender device 102 by using the Rx unit 306. In an embodiment, the processor unit 304 can be configured to receive the enriched information before establishing the call with the sender device 102. In another embodiment, the processor unit 304 can be configured to receive the enriched information after establishing the call with the sender device 102. In another embodiment, the processor unit 304 can be configured to receive the enriched information after terminating the call with the sender device 102. The processor unit 304 fetches the enriched information from the information source.

Further, the processor unit 304 can be configured to determine the correlation between the enriched information and the call. Further, the processor unit 304 can be configured to display the enriched information based on the correlation. The Tx unit 308 communicates internally with the units and externally with the sender device 102. Further, the functionalities of the receiver device 104 are explained in conjunction with the FIGS. 8-16.

The FIG. 3 shows exemplary units of the receiver device 104 but it is to be understood that other embodiments are not limited thereon. In other embodiments, the receiver device 104 may include less or more number of units. Further, the labels or names of the units are used only for illustrative purpose and does not limit the scope of the invention. One or more units can be combined together to perform same or substantially similar function in the receiver device 104.

FIG. 4 illustrates various units in the server, according to an embodiment as disclosed herein. In an embodiment, the server 400 includes a memory unit 402, a processor unit 404, a receiver (Rx) unit 406, and a transmitter (Tx) unit 408. In an embodiment the server can be an Enhanced Visual Call (EVC) server.

The memory unit 402 may include one or more computer-readable storage media. The memory unit 402 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 402 may, in some examples, be considered a non-transitory storage medium. The term "non-transitory" may indicate that the storage medium is not embodied in a carrier wave or a propagated signal. However, the term "non-transitory" should not be interpreted to mean that the memory unit 402 is non-movable. In some examples, the memory unit 402 can be configured to store larger amounts of information than the memory. In certain examples, a non-transitory storage medium may store data that can, over time, change (e.g., in Random Access Memory (RAM) or cache).

The processor unit 404 can be configured to receive the message including the enriched information from the sender device 102. In an embodiment, the processor unit 404 can be configured to receive the enriched information before establishing the call. In another embodiment, the processor unit 404 can be configured to receive the enriched information after establishing the call. In another embodiment, the processor unit 404 can be configured to receive the enriched information after terminating a call. Further, the processor unit 404 can be configured to send the message to the receiver device 104. The Rx unit 406 and the Tx unit 408 communicates internally with the units and externally with the sender device 102 and the receiver device 104. Further, the functionalities of the server 400 are explained in conjunction with the FIGS. 8-16.

The FIG. 4 shows exemplary units of the server 400 but it is to be understood that other embodiments are not limited thereon. In other embodiments, the server 400 may include less or more number of units. Further, the labels or names of the units are used only for illustrative purpose and does not limit the scope of the invention. One or more units can be combined together to perform same or substantially similar function in the server 400.

FIG. 5 is a flow diagram illustrating a method 500 for sharing the enriched information associated with the call by the sender device 102, according to an embodiment as disclosed herein. At step 502, the method 500 includes fetching the enriched information from the information source. The method 500 allows the processor unit 204 to fetch the enriched information from the information source.

At step 504, the method 500 includes sending the message including the enriched information to the receiver device 104. The method 500 allows the processor unit 204 to send the message including the enriched information to the receiver device 104. In an embodiment, the enriched information is sent before establishing the call. In another embodiment, the enriched information is sent after establishing the call. In another embodiment, the enriched information is sent after terminating the call.

The various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention.

FIG. 6 is a flow diagram illustrating a method 600 for displaying the enriched information associated with the call on the receiver device 104, according to an embodiment as disclosed herein. At step 602, the method 600 includes receiving the message including the enriched information from the sender device 102. The method 600 allows the processor unit 304 to receive the message including the enriched information from the sender device 102. In an embodiment, the enriched information is received before establishing the call. In another embodiment, the enriched information is received after establishing the call. In another embodiment, the enriched information is received before terminating the call. In an embodiment, the enriched information is fetched from the information source.

At step 604, the method 600 includes determining the correlation between the enriched information with the call. The method 600 includes the processor unit 304 to determine the correlation between the enriched information with the call. At step 606, the method 600 includes displaying the enriched information based on the correlation. The method 600 allows the processor unit 304 to display the enriched information based on the correlation.

The various actions, acts, blocks, steps, or the like in the method 600 may be performed in the order presented, in a different order or simultaneously. Further, in some embodiments, some of the actions, acts, blocks, steps, or the like may be omitted, added, modified, skipped, or the like without departing from the scope of the invention.

FIG. 7 is a flow diagram illustrating a method 700 for sharing the enriched information associated with the call via the server 400, according to an embodiment as disclosed herein. The server 400 can be the EVC server.

At step 702, the method 700 includes receiving the message including the enriched information from the sender device 102. The method 700 allows the server 400 to receive the message including the enriched information. At step 704, the method 700 includes sending the message to the receiver device 104. The method 700 allows the server 400 to send the message to the receiver device 104.

The various actions, acts, blocks, steps, or the like in the method 700 may be performed in the order presented, in a different order or simultaneously. Further, in some embodiments, some of the actions, acts, blocks, steps, or the like may be omitted, added, modified, skipped, or the like without departing from the scope of the invention.

FIG. 8 is a sequence diagram illustrating a method for sharing the enriched information associated with a call in a session, according to an embodiment as disclosed herein. In an embodiment, the sender device 102 includes an enriched client 102A, contents handling client 102B, and a call handling client 102C. Similarly, the receiver device 104 includes an enriched client 104A, contents handling client 104B, and a call handling client 104C. In an embodiment, the wireless communication system can include a content server 800A and Telephony AS 800B. The enriched client 102A, which resides in the sender device and allows the sender to use the EVC enabled services by interacting with other EVC functional components and other external entities. Similarly, the enriched client 104A, which resides in the receiver device and allows the receiver to use the EVC enabled services by interacting with other EVC functional components and other external entities.

In an embodiment, consider a scenario where the sender (can be referred as EVC user) tries to place the enriched call request to the receiver (can be referred as EVC user) for sharing the enriched information. The enriched information can be, for example, the text (i.e., plain text or real-time text), multimedia contents, profile information, SNS content, web content, location information, or the like. In an embodiment the EVC user can be either the normal end user or the business end user where both need to have the EVC service subscription. The signaling sequence 800 depicts communication between the sender device 102, the receiver device 104, and the server 400.

In an embodiment, the server 400, which resides in the network domain and interacts with the enriched clients (i.e., enriched client 102A and enriched client 102A) and other network components such as EVC XML Document Management Server (XDMS), or other external entities; Further, the server 400 is a user-specific functional component. The functionalities are performed in the home network, and are invoked when servicing the requests from the EVC user. The server 400 handles requests related to EVC data, on behalf of the EVC user it serves and enforces EVC user preferences and service provider policies. Additionally, the server 400 is responsible for authorization and authentication of all the requests coming from or terminating into enriched client. The server 400 also handles enriched client registration, ensures data integrity and confidentiality, and user privacy.

At step 802: The enriched client 102A of the sender device 102 obtains the enriched information (i.e., content, URL, or the like) for composing call correlation information (i.e., call-corrlelation-info) and EVC data (i.e., call-associated-data).

At step 804: The enriched client 102A sends a SIP INVITE message to the server 400. In an embodiment, the SIP INVITE message includes EVC service related IP Multimedia Subsystem (IMS) Communication Service Identifier (ICSI) and IMS Application Reference Identifier (IARI) (i.e., ICSI: EVC, IARI: oma.evc). The SIP INVITE message is used to establish a SIP session with a Message Session Relay Protocol (MSRP) channel to transmit the enriched information. In an embodiment, the ICSI and IARI are used to distinctly identify the enriched calling scenarios. 3rd Generation Partnership Project (3GPP) has defined service and application identifiers to be used for IMS services. These identifiers can be used by both clients (i.e., sender device 102 and the receiver device 104) and network. The clients can use the identifiers to indicate their capability to the network. The EVC ICSI is urn7:3gpp-service: ims.icsi.oma.evc. When enriched information sharing is to be defined as an application within the EVC service, the EVC service uses the IARI to explicitly identify itself. The IARI to be used for the EVC service may be: urn-7:3gpp-application.ims.iari.oma.evc. Further, the ICSI and the IARI are coded as Uniform Resource Name(s) (URNs) and included into a SIP message by using the two 3GPP defined media feature tags: g.3gpp.icsi-ref and g.3gpp.iari-ref, respectively. For example:

+g.3gpp.iari-ref="urn%3Aurn-7%3A3gpp-application.ims.iari.oma.evc
+g.3gpp.icsi-ref="urn%3Aurn-7%3A3gpp-service.ims.icsi.oma.evc Further, the following SIP messages can carry these service identifiers as described below:

INVITE (in Accept-Contact and Contact header) and subsequent 200 OK (in Contact header).

REGISTER (in Contact header, handling of service identifier in REGISTER method in the network is optional) and subsequent 200 OK (in Contact header).

OPTIONS (in Contact header of 200 OK)

MESSAGE

At step 806: After receiving the SIP INVITE message, the server 400 transmits the SIP INVITE message to the enriched client 104A of the receiver device 104, for sharing the enriched information.

At step 808: The enriched client 104A automatically accepts (i.e., Auto_Accept) the SIP INVITE message received from the server 400 for receiving the enriched information.

At step 810: After accepting the SIP INVITE message, the enriched client 104A sends 200 OK response message(s) to the server 400. The server 400 transmits the 200 OK response message(s) to the enriched client 102A.

At step 812: After receiving the 200 OK response message, a MSRP channel is established between the enriched client 102A and the enriched client 104A. The MSRP channel is used to transmit XML payload containing the enriched information. In an embodiment, the enriched information is shared either in the form of a push message or a pull message. In an embodiment, a XML-based protocol is used to share the enriched information to the enriched client 104A. In an example, the structure of the enriched information is shown below:

Structure of Enriched Information:

```
<?xml version="1.0" encoding="UTF-8"?>
<cpm-evfw xmlns="urn:oma:xml:cpm:evfw"
xmlns:xsi="http://www.w3.org/2001/XMLSchema-instance"
xmlns:evc="urn:oma:xml:evc:enrichedinfo">
<evc:evcenrichedinfo>
<evc:call-correlation-info>
<evc:from>[MSISDN or SIP URI]</evc:from>
<evc:to>[MSISDN or SIP URI]</evc:to>
<evc:call-seq>[CSeq#]</evc:call-seq>
<evc:subject>this is call subject</evc:subject>
</ evc:call-correlation-info>
< evc:call-associated-data type="p2p">
<evc:link>[HTTP URL]</evc:link>
<evc:location>
<evc:lat> 17.308688 </evc:lat>
<evc:long> 77.695313 </evc:long>
</evc:location>
</evc:call-associated-data >
</evc:evcenrichedinfo>
</cpm-evfw>
```

In an embodiment, the elements under "evcenrichedinfo" are mandatory and also possible to extend by adding new elements. The elements under "call-correlation-info" are included to associate the enriched information with the call that is being setup. The elements under "call-correlation-info" can be extended that will help the enriched client 104A to identify the call uniquely. Further, the elements under "call-associated-dat" A include the link(s) (sender provided information) to the enriched information that the enriched client 104A associates with the call. If the enriched information is not the web page, then the elements corresponding to the stored file is included. The enriched client 104A retrieves the web page or the file from the link or URL (sender provided information) provided before displaying the enriched information associated with the call to the receiver.

At step 814: Once the XML payload sharing is completed between the enriched client 102A and the enriched client 104A, the enriched client 102A initiates or sends a SIP BYE message to terminate the SIP session to the server 400.

At step 816: After receiving the SIP BYE message, the server 400 transmits the SIP BYE message to the enriched client 104A to terminate the SIP session between the enriched client 102A and the enriched client 104A.

At step 818: The enriched client 104A sends 200 OK response message(s) to the server 400.

At step 820: The server 400 transmits the 200 OK response message(s) to the enriched client 102A.

The various steps in the sequence diagram 800 may be performed in the order presented, in a different order or simultaneously. Further, in some embodiments, some of the steps may be omitted, added, modified, skipped, or the like without departing from the scope of the invention.

FIG. 9 is a sequence diagram illustrating a method for sharing the enriched information associated with a call using a SIP message, according to an embodiment as disclosed herein. In an embodiment, the sender device 102 includes the enriched client 102A, contents handling client 102B, and the call handling client 102C. Similarly, the receiver device 104 includes the enriched client 104A, contents handling client 104B, and the call handling client 104C.

In an embodiment, consider a scenario where the sender (can be referred as EVC user) tries to place the enriched call request to the receiver (can be referred as EVC user) for sharing the enriched information. The enriched information can be, for example, the text (i.e., plain text or real-time text), multimedia contents, profile information, SNS content, web content, location information, or the like. In an embodiment the EVC user can be either the normal end user or the business where both need to have the EVC service subscription. The signaling sequence 900 depicts communication between the sender device 102, the receiver device 104, and the server 400.

At step 902: The enriched client 102A of the sender device 102 obtains the enriched information (i.e., content, Uniform Resource Locator (URL), or the like) for composing call correlation information (i.e., call-corrlelation-info) and EVC data (i.e., call-associated-data).

At step 904: The enriched client 102A sends a SIP message to the server 400. In an embodiment, the SIP message includes EVC service related ICSI and IARI (i.e., ICSI: EVC, IARI: oma.evc). Further, the SIP message includes the XML payload containing the enriched information as described above in conjunction with the FIG. 8.

At step 906: After receiving the SIP message, the server 400 transmits the SIP message to the enriched client 104A of the receiver device 104, for sharing the enriched information.

At step 908: Once the SIP message with the XML payload for the enriched information is received, the enriched client 104A sends 200 OK response message(s) to the server 400.

At step 910: The server 400 transmits the 200 OK response message(s) to the enriched client 102A.

The various steps in the sequence diagram 900 may be performed in the order presented, in a different order or simultaneously. Further, in some embodiments, some of the steps may be omitted, added, modified, skipped, or the like without departing from the scope of the invention.

FIG. 10 is a sequence diagram illustrating a method for establishing the enriched call setup, where the enriched information is shared initially followed by the call setup, according to an embodiment as disclosed herein. In an embodiment, the sender device 102 includes the enriched client 102A, contents handling client 102B, and the call handling client 102C. Similarly, the receiver device 104 includes the enriched client 104A, contents handling client 104B, and the call handling client 104C. The signaling sequence 1000 depicts communication between the sender device 102, the receiver device 104, the server 400, content server 800A, and the Telephony AS 800B.

At step 1002: The sender selects to make the enriched call to the receiver for sharing the enriched information. The enriched information can be, for example, the text (i.e., plain text or real-time text), multimedia contents, profile information, SNS content, web content, location information, or the like. In an embodiment, the EVC user can be either the normal end user or the business where both need to have the EVC service subscription.

At step 1004: In an embodiment, if the content of the enriched information that the sender would like to share is at the content server 800A (i.e., an information source) or locally on the sender device 102, then the enriched client 102A fetches the link to the content. In another embodiment, if the content of the enriched information that the sender would like to share is not available at the content server 800A then, the enriched client 102A uploads or posts the content to the content server 800A and fetches the link to the stored content.

At step 1006: The enriched client 102A shares the enriched information with the enriched client 104A. In an embodiment, the mechanism for sharing the enriched information is explained in conjunction with the FIG. 8 as described above. In another embodiment, the mechanism for sharing the enriched information is explained in conjunction with the FIG. 9 as described above. In an embodiment, if the sharing of enriched information with the enriched client 104A is not successful for a specific duration of time (i.e., operator configured parameter or implementation specific), then the enriched client 102A informs the sender (i.e., in the form of a visual indication, audio message, or the like) that it is unable to establish the enriched call. Further, the user may be provided with an option to make a plain call or withdraw from making the call to the receiver.

At step 1008: After receiving the enriched information, the enriched client 104A extracts the enriched information including the call correlation information and EVC data. After extracting the enriched information, the enriched client 104A determines if there is any incoming call associated to the call correlation information. If the incoming call is not associated to the call correlation information, the enriched client 104A can store (i.e., cache) and hold from displaying the enriched information to the receiver. In an embodiment, if the incoming call associated to the call correlation information is unavailable within the specified duration, then the enriched client 104A discards the stored enriched information.

At step 1010: After receiving the confirmation that the enriched information is shared with the enriched client 104A, the enriched client 102A triggers the call handling client 102C to initiate call setup with the call handling client 104C of the receiver.

At step 1012: The call handling client 102C sends the call setup request message to the Telephony AS 800B to setup the call with the receiver.

At step 1014: After receiving the call setup request message, the Telephony AS 800B transmits the call setup request message to the call handling unit 104C. In an embodiment, if the call setup fails, then the enriched client 102A informs the sender that it is unable to make the enriched call. The user may be provided with an option either to make the plain call or withdraw from making the call to the receiver.

At step 1016: The enriched client 104A triggers the contents handling client 104B to fetch the contents associated to the URL or link in the EVC data from the content server 800A. The content server 800A will authorize before providing the content to the contents handling unit 104B.

At step 1018: The fetched contents are then correlated with the incoming call and are displayed to the receiver.

At step 1020: The receiver views the displayed enriched information and may decide to accept or reject the enriched call.

At step 1022: After accepting the call by the receiver, the call setup process is completed and the enriched call is established between the sender and the receiver.

The various steps in the sequence diagram 1000 may be performed in the order presented, in a different order or simultaneously. Further, in some embodiments, some of the steps may be omitted, added, modified, skipped, or the like without departing from the scope of the invention.

FIGS. 11a and 11b is a flow diagram illustrating a method 1100 for establishing the enriched call setup, where the enriched information is shared initially followed by the call setup, according to an embodiment as disclosed herein. At step 1102, the method 1100 includes initiating a process to share the enriched information associated with the call. The enriched information can be, for example, the text (i.e., plain text or real-time text), multimedia contents, profile information, SNS content, web content, location information, or the like. In an embodiment, the EVC user can be either the normal end user or the business where both need to have the EVC service subscription. At step 1104, the method 1100 includes opting to make the enriched call to the receiver.

If it is determined, at step 1106, that the content of the enriched information that the sender would like to share is in the content server 800A then, at step 1108, the method 1100 includes fetching the link to the content available in the content server 800A. The method 1100 allows the enriched client 102A to fetch the link to the content available in the content server 800A.

If it is determined, at step 1106, that the content of the enriched information that the sender would like to share is not available at the content server 800A then, at step 1110, the method 1100 includes uploading or posting the content to the content server 800A and fetching the link to the stored content. The method 1100 allows the enriched client 102A to upload or post the content to the content server 800A and fetching the link to the stored content.

At step 1112, the method 1100 includes sharing the enriched information with the enriched client 104A in the receiver device 104. The method 1100 allows the enriched client 102A shares the enriched information with the enriched client 104A. In an embodiment the mechanism for sharing the enriched information is explained in conjunction with the FIG. 8 as described above. In another embodiment, the mechanism for sharing the enriched information is explained in conjunction with the FIG. 9 as described above. In an embodiment, if the sharing of enriched information with the enriched client 104A is not successful for the specific duration of time (i.e., operator configured parameter or implementation specific), then the enriched client 102A informs the sender (i.e., in the form of a visual indication, audio message, or the like) that it is unable to establish the enriched call.

If it is determined, at step 1114, that the enriched information is successfully shared within the specified timeout period then, at step 1116, the method 1100 includes extracting the enriched information including the call correlation information and the EVC data. The method 1100 allows enriched client 104A to extract the enriched information including the call correlation information and the EVC data.

If it is determined, at step 1114, that the enriched information is not shared successfully within the specified timeout period then, at step 1118, the method 1100 includes informing the sender that establishing the enriched call is not possible and provides the option to the user to make the plain call or withdraw from making the call to the receiver. The method 1100 allows the enriched client 102A informs the sender that establishing the enriched call is not possible and provides the option to the sender to make the plain call or withdraw from making the call to the receiver. At step 1120, the method 1100 includes terminating the process to establish the enriched call with the receiver. The method 1100 allows the enriched client 102A to terminate the process to establish the enriched call with the receiver.

At step 1122, the method 1100 includes triggering the call handling client 102C to initiate call setup with the call handling client 104C of the receiver device 104. The method 1100 allows the enriched client 102A to trigger the call handling client 102C to initiate call setup with the call handling client 104C of the receiver. If it is determined, at step 1124, that the call setup with the call handling client 104C of the receiver device 104 is not successful then, at step 1126, the method 1100 includes informing the sender that establishing the enriched call is not possible and provides the option to the user to retry or make the plain call or withdraw from making the call to the receiver and looped back to step 1120 as described above. The method 1100 allows the enriched client 102A to inform the sender that establishing the enriched call is not possible and provides the option to the user to retry or make the plain call or withdraw from making the call to the receiver and looped back step 1120 as described above.

If it is determined, at step 1124, that the call setup with the call handling client 104C of the receiver is successful then, at step 1128, the method 1100 includes fetching the contents in the EVC data from the content server 800A. The method 1100 allows the contents handling client 104B to fetch the contents in the EVC data from the content server 800A. The content server 800A will authorize before providing the content to the contents handling unit 104B.

If it is determined, at step 1130, that any incoming call is associated to the call correlation information then, at step 1132, the method 1100 includes fetching the contents associated to the URL or link in the EVC data from the content server 800A. The method 1100 allows the contents handling client 104B to fetch the contents associated to the URL or link in the EVC data from the content server 800A. The content server 800A will authorize before providing the content to the contents handling unit 104B. At step 1134, the method 1100 includes correlating the fetched contents with the incoming call and is displayed to the receiver. The method 1100 allows the receiver device 104 to correlate the fetched contents with the incoming call and is displayed to the receiver.

At step 1136, the method 1100 includes displaying the enriched information and providing the option to the user to decide whether to accept or reject the enriched call. The method 1100 allows the receiver device 104 to display the enriched information and providing the option to the user to decide whether to accept or reject the enriched call. At step 1138, the method 1100 includes sending the display report to the sender and looped back to step 1120 as described above. The method 1100 allows the receiver device 104 to send the display report to the sender and looped back to step 1120 as described above.

If it is determined, at step 1130, that any incoming call is not associated to the call correlation information then, at step 1140, the method 1100 includes storing and holding from displaying the enriched information to the receiver. The method 1100 allows the enriched client 104A to store and hold from displaying the enriched information to the receiver.

If it is determined, at step 1142, that the incoming call associated to the call correlation information is unavailable within the specified duration then, at step 1144, the method 1100 includes discarding the stored enriched information and is looped back to step 1120 as described above. The method 1100 allows the enriched client 104A to discard the stored enriched information and is looped back to step 1120 as described above. If it is determined, at step 1142, that the incoming call associated to the call correlation information is available within the specified duration then, the method 1100 is looped back to step 1132 as described above.

The various actions, acts, blocks, steps, or the like in the method 1100 may be performed in the order presented, in a different order or simultaneously. Further, in some embodiments, some of the actions, acts, blocks, steps, or the like may be omitted, added, modified, skipped, or the like without departing from the scope of the invention.

FIG. 12 is a sequence diagram illustrating a method for establishing the enriched call setup, where the call is setup initially followed by sharing the enriched information associated with the call, according to an embodiment as disclosed herein. In an embodiment, the sender device 102 includes the enriched client 102A, contents handling client 102B, and the call handling client 102C. Similarly, the receiver device 104 includes the enriched client 104A, contents handling client 104B, and the call handling client 104C. The signaling sequence 1200 depicts communication between the sender device 102, the receiver device 104, the server 400, content server 800A, and the Telephony AS 800B.

At step 1202: The sender selects to make the enriched call to the receiver for sharing the enriched information. The enriched information can be, for example, the text (i.e., plain text or real-time text), multimedia contents, profile information, SNS content, web content, location information, or the like. In an embodiment, the EVC user can be either the normal end user or the business where both need to have the EVC service subscription.

At step 1204: The enriched client 102A triggers the call handling client 102C to initiate call setup with the call handling client 104C of the receiver.

At step 1206: The call handling client 102C sends the call setup request message to the Telephony AS 800B to setup the call with the receiver.

At step 1208: After receiving the call setup request message, the Telephony AS 800B transmits the call setup request message to the call handling unit 104C. In an embodiment, if the call setup fails, then the enriched client 102A informs the sender that it is unable to make the enriched call. The user may be provided with an option either to make the plain call or withdraw from making the call to the receiver.

At step 1210: In an embodiment, if the content of the enriched information that the sender would like to share is at the content server 800A (i.e., an information source) or locally on the sender device 102, then the enriched client 102A fetches the link to the content. In another embodiment, if the content of the enriched information that the sender would like to share is not available at the content server 800A then, the enriched client 102A uploads or posts the content to the content server 800A and fetches the link to the stored content.

At step 1212: The enriched client 102A shares the enriched information with the enriched client 104A. In an embodiment, the mechanism for sharing the enriched information is explained in conjunction with the FIG. 8 as described above. In another embodiment, the mechanism for sharing the enriched information is explained in conjunction with the FIG. 9 as described above. In an embodiment, if the sharing of enriched information with the enriched client 104A is not successful for the specific duration of time (i.e., operator configured parameter or implementation specific), then the enriched client 102A informs the sender (i.e., in the form of a visual indication, audio message, or the like) that it is unable to establish the enriched call. Further, the user may be provided with an option to make a plain call or withdraw from making the call to the receiver.

At step 1214: After receiving the enriched information, the enriched client 104A extracts the enriched information including the call correlation information and the EVC data. After extracting the enriched information, the enriched client 104A determines if there is any incoming call associated to the call correlation information. If the incoming call is not associated to the call correlation information, the enriched client 104A can store and hold from displaying the enriched information to the receiver. In an embodiment, if the incoming call associated to the call correlation information is unavailable within the specified duration, then the enriched client 104A discards the stored enriched information.

At step 1216: The enriched client 104A triggers the contents handling client 104B to fetch the contents associated to the URL or link in the EVC data from the content server 800A. The content server 800A will authorize before providing the content to the contents handling unit 104B.

At step 1218: The fetched contents are then correlated with the incoming call and are displayed to the receiver.

At step 1220: The receiver views the displayed enriched information and may decide to accept or reject the enriched call.

At step 1222: After accepting the call by the receiver, the call setup process is completed and the enriched call is established between the sender and the receiver.

The various steps in the sequence diagram 1200 may be performed in the order presented, in a different order or simultaneously. Further, in some embodiments, some of the steps may be omitted, added, modified, skipped, or the like without departing from the scope of the invention.

FIGS. 13a and 13b is flow diagram illustrating a method 1300 establishing the enriched call setup, where the call is setup initially followed by sharing the enriched information associated with the call, according to an embodiment as disclosed herein. At step 1302, the method 1300 includes initiating the process to share the enriched information associated with the call. The enriched information can be, for example, the text (i.e., plain text or real-time text), multimedia contents, profile information, SNS content, web content, location information, or the like. In an embodiment, the EVC user can be either the normal end user or the business where both need to have the EVC service subscription. At step 1304, the method 1300 includes opting to make the enriched call to the receiver.

If it is determined, at step 1306, that the content of the enriched information that the sender would like to share is in the content server 800A then, at step 1308, the method 1300 includes fetching the link to the content in the content server 800A. The method 1300 allows the enriched client 102A to fetch the link to the content in the content server 800A. If it is determined, at step 1306, that the content of the enriched information that the sender would like to share is not available at the content server 800A then, at step 1310, the method 1300 includes uploading or posting the content to the content server 800A and fetching the link to the stored content. The method 1300 allows the enriched client 102A to upload or post the content to the content server 800A and fetching the link to the stored content.

If it is determined, at step 1312, that the call setup with the call handling client 104C of the receiver is not successful then, at step 1314, the method 1300 includes informing the sender that establishing the enriched call is not possible and provides the option to the user to retry or make the plain call or withdraw from making the call to the receiver. The method 1300 allows the enriched client 102A to inform the sender that establishing the enriched call is not possible and provides the option to the user to make the plain call or withdraw from making the call to the receiver.

At step 1316, the method 1300 includes terminating the process to establish the enriched call. The method 1300 allows the enriched client 102A to terminate the process to establish the enriched call. If it is determined, at step 1312, that the call setup with the call handling client 104C of the receiver is successful then, at step 1318, the method 1300 includes sharing the enriched information with the enriched client 104A. The method 1300 allows the enriched client 102A shares the enriched information with the enriched client 104A. In an embodiment, the mechanism for sharing the enriched information is explained in conjunction with the FIG. 8 as described above. In another embodiment, the mechanism for sharing the enriched information is explained in conjunction with the FIG. 9 as described above.

If it is determined, at step 1320, that the enriched information is successfully shared within the specified timeout period then, at step 1322, the method 1300 includes fetching the enriched information including the call correlation information and the EVC data. The method 1300 allows enriched client 104A to fetch the enriched information including the call correlation information and the EVC data. If it is determined, at step 1320, that the enriched information is not shared successfully within the specified timeout period then, at step 1324, the method 1300 includes informing the sender that establishing the enriched call is not possible and provides the option to the user to make the plain call or withdraw from making the call to the receiver and is looped back to step 1316. The method 1300 allows the enriched client 102A informs the sender that establishing the enriched call is not possible and provides the option to the user to make the plain call or withdraw from making the call to the receiver and is looped back to step 1316.

If it is determined, at step 1326, that any incoming call is associated to the call correlation information then, at step 1328, the method 1300 includes fetching the contents associated to the URL or link in the EVC data from the content server 800A. The method 1300 allows the contents handling client 104B to fetch the contents associated to the URL or link in the EVC data from the content server 800A. The content server 800A will authorize before providing the content to the contents handling unit 104B.

At step 1330, the method 1300 includes correlating the fetched contents with the incoming call and is displayed to the receiver. The method 1300 allows the receiver device 104 to correlate the fetched contents with the incoming call and is displayed to the receiver.

If it is determined, at step 1332, that the enriched call is not answered by the receiver then, at step 1334, the method 1300 includes displaying the enriched information. The method 1300 allows the receiver device 104 to display the enriched information.

At step 1336, the method 1300 includes providing the option to the user to decide whether to accept or reject the enriched call. The method 1300 allows the receiver device to provide the option to the user to decide whether to accept or reject the enriched call.

At step 1338, the method 1300 includes sending the display report to the sender and looped back to step 1316. The method 1300 allows the receiver device 104 to send the display report to the sender and looped back to step 1316. If it is determined, at step 1332, that the call is answered by the receiver then, at step 1324, the method 1300 includes discarding the enriched information and looped back to step 1338 as described above. The method 1300 allows the receiver device to discard the enriched information and looped back to step 1338 as described above.

If it is determined, at step 1326, that any incoming call is not associated to the call correlation information then, at step 1338, the method 1300 includes storing and holding from displaying the enriched information to the receiver. The method 1300 allows the enriched client 104A to store and hold from displaying the enriched information to the receiver.

If it is determined, at step 1344, that the incoming call associated to the call correlation information is unavailable within the specified duration then, the method 1300 is looped back to step 1316 as described above. If it is determined, at step 1344, that the incoming call associated to the call correlation information is available within the specified duration then, at step 1324, the method 1300 looped back to step 1328 as described above.

The various actions, acts, blocks, steps, or the like in the method 1300 may be performed in the order presented, in a different order or simultaneously. Further, in some embodiments, some of the actions, acts, blocks, steps, or the like may be omitted, added, modified, skipped, or the like without departing from the scope of the invention.

FIG. 14 is a sequence diagram illustrating a method for sharing the enriched information before establishing the call, according to an embodiment as disclosed herein. In an embodiment, the sender device 102 includes the enriched client 102A, contents handling client 102B, and the call handling client 102C. Similarly, the receiver device 104 includes the enriched client 104A, contents handling client 104B, and the call handling client 104C. The signaling sequence 1400 depicts communication between the sender device 102, the receiver device 104, the server 400, content server 800A, and the Telephony AS 800B.

At step 1402: The sender selects to make the enriched call to the receiver for sharing the enriched information. The enriched information can be, for example, the text (i.e., plain text or real-time text), multimedia contents, profile information, SNS content, web content, location information, or the like. In an embodiment, the EVC user can be either the normal end user or the business where both need to have the EVC service subscription.

At step 1404: The enriched client 102A shares the enriched information with the enriched client 104A. In an embodiment, the mechanism for sharing the enriched information is explained in conjunction with the FIG. 8 as described above. In another embodiment, the mechanism for sharing the enriched information is explained in conjunction with the FIG. 9 as described above. In an embodiment, if sharing of the enriched information with the enriched client 104A is not successful for the specific duration of time (i.e., operator configured parameter or implementation specific), then the enriched client 102A informs the sender (i.e., in the form of a visual indication, audio message, or the like) that it is unable to establish the enriched call. Further, the user may be provided with an option to make a plain call or withdraw from making the call to the receiver.

At step 1406: The enriched client 102A triggers the call handling client 102C to initiate the call setup towards the call handling client 104C of the receiver device 104. The call is established after displaying the enriched information to the receiver.

The various steps in the sequence diagram 1400 may be performed in the order presented, in a different order or simultaneously. Further, in some embodiments, some of the steps may be omitted, added, modified, skipped, or the like without departing from the scope of the invention.

FIG. 15 is a sequence diagram illustrating a method for sharing the enriched information after establishing the call, according to an embodiment as disclosed herein. In an embodiment, the sender device 102 includes the enriched client 102A, contents handling client 102B, and the call handling client 102C. Similarly, the receiver device 104 includes the enriched client 104A, contents handling client 104B, and the call handling client 104C. The signaling sequence 1500 depicts communication between the sender device 102, the receiver device 104, the server 400, content server 800A, and the Telephony AS 800B.

At step 1502: The call handling client 102C of the sender device 102 initiates the call setup towards the call handling client 104C of the receiver device 104. The call is established without the display of the enriched information to the receiver.

At step 1504: Upon request from the receiver to share the enriched information, after establishing the call (i.e., during the call), the enriched client 102A gather the call information and the enriched information.

At step 1506: The enriched client 102A shares the enriched information with the enriched client 104A.

At step 1508: The call is terminated and the received enriched information can be stored locally on the receiver device or on the network.

The various steps in the sequence diagram 1500 may be performed in the order presented, in a different order or simultaneously. Further, in some embodiments, some of the steps may be omitted, added, modified, skipped, or the like without departing from the scope of the invention.

FIG. 16 is a sequence diagram illustrating a method for sharing the enriched information after terminating the call, according to an embodiment as disclosed herein. In an embodiment, the sender device 102 includes the enriched client 102A, contents handling client 102B, and the call handling client 102C. Similarly, the receiver device 104 includes the enriched client 104A, contents handling client 104B, and the call handling client 104C. The signaling sequence 1600 depicts communication between the sender device 102, the receiver device 104, the server 400, content server 800A, and the Telephony AS 800B.

At step 1602: The call was rejected or unanswered by the receiver, the ongoing call setup is terminated.

At step 1604: Upon request from the sender to share the enriched information with the receiver post cancellation of the call with the receiver, the enriched client 102A fetches the call information and the enriched information.

At step 1606: The enriched client 102A shares the enriched information with the enriched client 104A. In an embodiment, the mechanism for sharing the enriched information is explained in conjunction with the FIG. 8 as described above. In another embodiment, the mechanism for sharing the enriched information is explained in conjunction with the FIG. 9 as described above. The enriched client 104A stores the enriched information in the call log.

The various steps in the sequence diagram 1600 may be performed in the order presented, in a different order or simultaneously. Further, in some embodiments, some of the steps may be omitted, added, modified, skipped, or the like without departing from the scope of the invention.

FIG. 17 illustrates a computing environment implementing the method for sharing the enriched information associated with the call, according to an embodiment as disclosed herein. As depicted in the figure, the computing environment 1702 comprises at least one processing unit 1708 that is equipped with a control unit 1704 and an Arithmetic Logic Unit (ALU) 1706, a memory 1710, a storage unit 1712, plurality of networking devices 1716 and a plurality Input output (I/O) devices 1714. The processing unit 1708 is responsible for processing the instructions of the schemes. The processing unit 1708 receives commands from the control unit 1704 in order to perform its processing. Further, any logical and arithmetic operations involved in the execution of the instructions are computed with the help of the ALU 1706.

The overall computing environment 1702 can be composed of multiple homogeneous or heterogeneous cores, multiple CPUs of different kinds, special media and other accelerators. The processing unit 1708 is responsible for processing the instructions of the schemes. Further, the plurality of processing units 1708 may be located on a single chip or over multiple chips.

The scheme comprising of instructions and codes required for the implementation are stored in either the memory unit 1710 or the storage 1712 or both. At the time of execution, the instructions may be fetched from the corresponding memory 1710 or storage 1712, and executed by the processing unit 1708.

In case of any hardware implementations various networking devices 1716 or external I/O devices 1714 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 17 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiment as described herein.

The invention claimed is:

1. A method for sharing information associated with a call by a receiving device in a communication system, the method comprising:
  establishing a message session relay protocol (MSRP) session with a sending device;
  receiving enriched information through the MSRP session from the sending device, the enriched information including first information and second information;
  identifying the first information, wherein the first information identifies a call associated with the enriched information;
  if the call associated to the first information is found, presenting the enriched information based on the identified first information; and
  if the call associated to the first information is not found, caching the enriched information,
  wherein the second information includes a scenario type associated with the call and data being shared between the sending device and the receiving device, and
  wherein the scenario type includes at least one of a person-to-person scenario, a business-to-client scenario, or a web and call scenario.

2. The method of claim 1, wherein the enriched information is received from the sending device during at least one of before establishing the call, after establishing the call, or after terminating the call.

3. The method of claim 1,
  wherein the first information comprises at least one of identification information of the sending device or identification information of the receiving device, and
  wherein the identification information of the sending device or the identification information of the receiving device, which is included in the first information, uses either a mobile station international subscriber directory number (MSISDN) or a session initiation protocol (SIP) uniform resource identifier (URI).

4. The method of claim 1, wherein the second information further comprises hyper link information associated with the call.

5. The method of claim 1, wherein the second information further comprises at least one of information for representing a location of the sending device or information for sharing a web transaction reference of the sending device.

6. The method of claim 1, further comprising:
  receiving a session initiation protocol (SIP) invite message for sharing the enriched information via a server from the sending device; and
  sending an SIP response message in response to the SIP invite message.

7. The method of claim 1, wherein the enriched information is automatically accepted by the receiving device.

8. A receiving device for sharing information associated with a call in a communication system, the receiving device comprising:
  a transceiver; and
  at least one processor coupled with the transceiver and configured to:
    establish a message session relay protocol (MSRP) session with a sending device,
    control the transceiver to receive enriched information through the MSRP session from the sending device, the enriched information including first information and second information,
    identify the first information, wherein the first information identifies a call associated with the enriched information,
    if the call associated to the first information is found, present the enriched information based on the identified first information, and
    if the call associated to the first information is not found, caching the enriched information, wherein the second information includes a scenario type associated with the call and data being shared between the sending device and the receiving device, and wherein the scenario type includes at least one of a person-to-person scenario, a business-to-client scenario, or a web and call scenario.

9. The receiving device of claim 8, wherein the enriched information is received from the sending device during at least one of before establishing the call, after establishing the call, or after terminating the call.

10. The receiving device of claim 8, wherein the first information comprises at least one of identification information of the sending device or identification information of the receiving device, and wherein the identification information of the sending device or the identification information of the receiving device, which is included in the first information, uses either a mobile station international subscriber directory number (MSISDN) or a session initiation protocol (SIP) uniform resource identifier (URI).

11. The receiving device of claim 8, wherein the second information further comprises hyper link information associated with the call.

12. The receiving device of claim 8, wherein the second information further comprises at least one of information for representing a location of the sending device or information for sharing a web transaction reference of the sending device.

13. The receiving device of claim 8, wherein the at least one processor is further configured to:

control the transceiver to receive a session initiation protocol (SIP) invite message for sharing the enriched information via a server from the sending device, and control the transceiver to transmit an SIP response message in response to the SIP invite message.

14. The receiving device of claim 8, wherein the enriched information is automatically accepted by the receiving device.

* * * * *